(12) United States Patent
Fransson et al.

(10) Patent No.: US 6,445,706 B1
(45) Date of Patent: Sep. 3, 2002

(54) METHOD AND DEVICE IN TELECOMMUNICATIONS SYSTEM

(75) Inventors: Clarence Fransson, Älvsjö; Gunnar Larsson, Tumba; Raimo Sissonen, Huddinge; Bengt Kvist, Älvsjö, all of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/409,518

(22) Filed: Sep. 30, 1999

Related U.S. Application Data

(63) Continuation of application No. PCT/SE98/00569, filed on Mar. 27, 1998.

(30) Foreign Application Priority Data

Apr. 1, 1997 (SE) .............................................. 9701185

(51) Int. Cl.⁷ .............................................. H04L 12/28
(52) U.S. Cl. .................................. 370/395.42; 370/412
(58) Field of Search ................................ 370/252, 253, 370/414, 412, 429, 432, 357, 360, 389, 392, 468, 413, 418, 394, 395.4, 395.42, 395.43

(56) References Cited

U.S. PATENT DOCUMENTS

| | | | |
|---|---|---|---|
| 5,557,607 A | * 9/1996 | Holden | 370/58.2 |
| 5,956,342 A | * 9/1999 | Manning et al. | 370/414 |
| 5,963,553 A | * 10/1999 | Wicklung | 370/390 |
| 5,983,278 A | * 11/1999 | Chong et al. | 709/235 |

FOREIGN PATENT DOCUMENTS

EP  678996  2/1995

OTHER PUBLICATIONS

Wu, Jung–Shyr, et al., "Traffic management circuit for the shared buffer memory switch with multicasting", Computer Communications vol. 6 No. 11 (11/93) pp. 736–739.

Hui. Joseph Y., et al., "Queueing Analysis for Multicast Packet Switching", IEEE Transactions on Communications vol. 42 No. 2/3/4 (2–4/94) pp.723–731.

McDysan, David E., et al, "ATM Theory and Application; Chapter 13 Traffic Control", McGraw–Hill, Inc. 1994 pp.370–372.

Wu, Jung–Shyr, et al., ATM Shared Memory Switch with Multicasting Balancing', IEICE Trans. Commun., vol. E78–B, No. 9 (9/95) pp.1262–1268.

Haung, Yieh R., et al., "A high–performance input access scheme for ATM multicast switching", Telecommunication Systems 6 (1996) pp.367–379.

* cited by examiner

Primary Examiner—Chau Nguyen
Assistant Examiner—Alexander O. Boakye
(74) Attorney, Agent, or Firm—Burns, Doane, Swecker & Mathis, L.L.P.

(57) ABSTRACT

A method and a buffer structure ensure a fair share of the bandwidth between point-to-point and point-to-multipoint connections with the same or different priorities. For each priority class, the buffer structure includes one queue for each physical link of restoring point-to-point cells for each priority level and one queue for point-to-multipoint cells. When a cell is to be transmitted on a link, the point-to-point and point-to-multipoint cells for this link, if any, from the highest priority class in each case are identified. If the cells belong to the same priority class, the cell stored first is transmitted.

6 Claims, 4 Drawing Sheets

METHOD AND DEVICE IN TELECOMMUNICATIONS SYSTEM

This application is a continuation of International Application No. PCT/SE98/00569 filed on Mar. 27, 1998, which designates the United States.

TECHNICAL FIELD

The present invention relates to ATM switches, and in particular to the buffering of cells in such switches.

BACKGROUND

ATM switches handle both point-to-point and point-to-multipoint connections. All connections in an ATM switch should be served according to their priority, so that cells with higher priority are always transmitted before cells with a lower priority, independently of whether the connection is a point-to-point or a point-to-multipoint connection.

One known method for this is to copy all arriving point-to-multipoint cells to all leaves before putting the cell in the buffer queue. In this way, a point-to-multipoint cell will be stored in the buffers of all links on which it should be transmitted. This requires that the input cell flow be stopped until all cells have been copied to all appropriate buffers, which will lead to decreased throughput and an increased risk for loss of cells.

It is possible to perform the copying of cells in the background, i.e. to wait for empty cell slots in each link, but this may take a long time, which means that the fair order between point-to-point cells and point-to-multipoint cells cannot be guaranteed. To guarantee that the fair order is kept without having to stop incoming cells, all copying of cells would have to be done in one cell interval, i.e. the time between the start of two subsequent cells. This would either limit the number of possible leaves in a point-to-multipoint connection or require very fast memories, which would lead to an increase in costs.

SUMMARY OF THE INVENTION

It is an object of the present invention to provide a simple method and an apparatus for handling point-to-multipoint cells together with the point-to-point cells which will:

allow connection to an arbitrary number of points in a point-to-multipoint connection;

guarantee full fairness between all connections according to both their priority class and their logical weight.

These objects are achieved with the method according to the invention by storing point-to-point cells and point-to-multipoint cells separately and according to the physical link they belong to, and transmitting cells according to their physical link, priority class and the time they were stored.

The invention offers the following advantages:

Point-to-multipoint cells can be handled for all priority classes, not only in the same priority class as the point-to-point cells.

No separate priority classes are needed for point-to-multipoint cells, which may be handled in the same priority classes as point-to-point cells.

A reference clock for setting a time stamp on the cells is not needed

It can be ensured that all cells within the same priority class can be compared to each other independently of how long the cells have been stored in the buffers.

BRIEF DESCRIPTION OF THE DRAWINGS

In the following the invention will be described in more detail, with particular reference to the drawings, in which.

DETAILED DESCRIPTION

Figure 1:
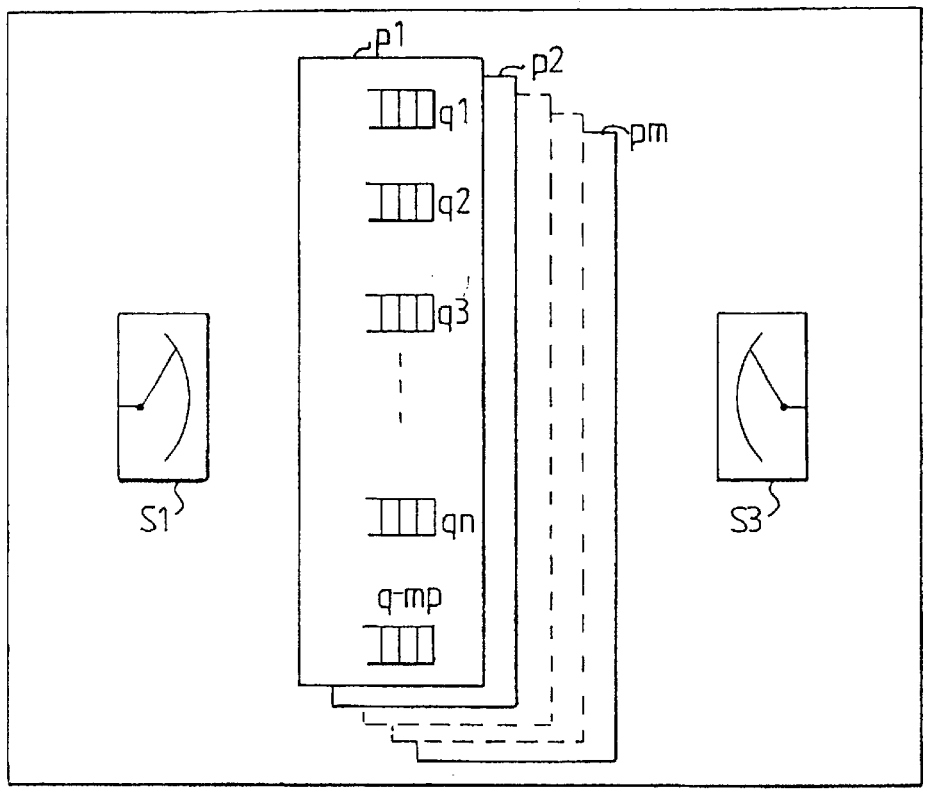
FIG. 1 shows the buffer structure in an ATM switch according to one embodiment of the invention.

FIG. 1 shows a buffer structure in an ATM switch according to a preferred embodiment of the invention. The buffer structure is designed to handle connections with several different priority classes, p1, p2, . . . pm in such a way that connections with a priority class p1 are served as long as there are cells with this priority, then connections with priority class p2 are served, etc.

The buffer structure comprises a number of sets of queues, or buffers, one set for each priority class p1, p2, . . . , pm. Each set of queues comprises one queue q1, q2, . . . , qn for each physical link and one queue q-mp for point-to-multipoint connections.

Of course, all connections may be given the same priority, in which case there will only be one set of queues q1, q2, . . . , qn, q-mp.

An input selector 1 selects the queue into which an incoming cell should be put. When applicable, the input queue selector s1 also adds the sequence number to the cell header as explained later in the description of FIG. 6.

There is an output queue selector s3 which selects the queue from which one or more cells are to be transmitted to the output.

When an incoming cell to an ATM switch arrives at an input port of the switch, the information in the header is read to determine to what virtual connection the cell belongs, i.e. on what output link it should be switched. The priority class of the virtual connection is also determined. This information may be found in the cell, or in a table in the switch.

In this document, the priority classes are numbered pc1, pc2, pc3, etc., with pc1 being the highest priority. This means that pc1 is always served as long as there are cells in the buffers in this priority class. When this is not the case, pc2 is served, etc.

Assuming that all links have the same logical weight, which is the simplest situation, the queues in the highest priority class are served according to the "round robin" principle, that is: one cell is taken from each queue in turn and sent to the appropriate output.

The more complex situation where the different connections may have different logical weights in addition to the different priority classes is handled simply by serving the queues more or less often according to the logical weight, so that, for example, a queue with logical weight 10× is served ten times more often than a queue with logical weight ×. For simplicity, the simple case of all connections having the same priority will be described here. It will be obvious to the skilled person how to extend the invention to work for connections with different logical weights.

When a link is chosen, the first cell in the point-to-multipoint queues in each priority class will be checked to see if any of them should be sent to the current link. The point-to-multipoint queue with the highest priority which contains cells to be transmitted on this link is identified. Then the highest priority level which has point-to-point cells for this link is determined.

If the identified point-to-multipoint queue is in a higher priority class than the point-to-point queue for the connection, the cell from the point-to-multipoint queue is selected. If the identified point-to-multipoint queue is in a lower priority class than the point-to-point queue for the connection, or if there are no point-to-multipoint cells for the connection, the cell from the point-to-point queue is selected. If the point-to-multipoint queue and the point-to-point,queue have the same priority, the cell which was first stored is selected and transmitted to the output.

Figure 2:
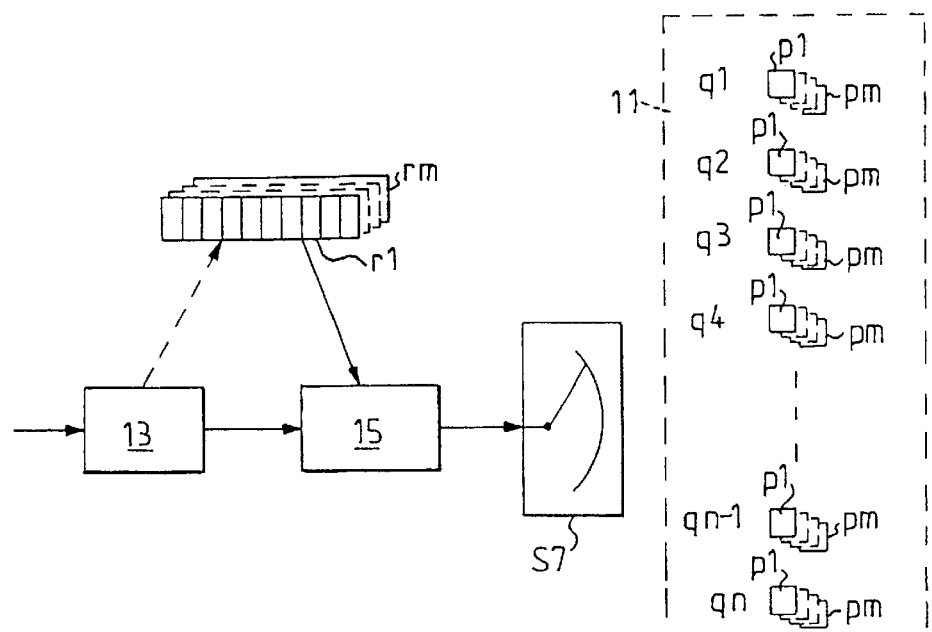
FIG. 2 shows schematically what happens when a cell is received in an ATM switch.
Figure 4:
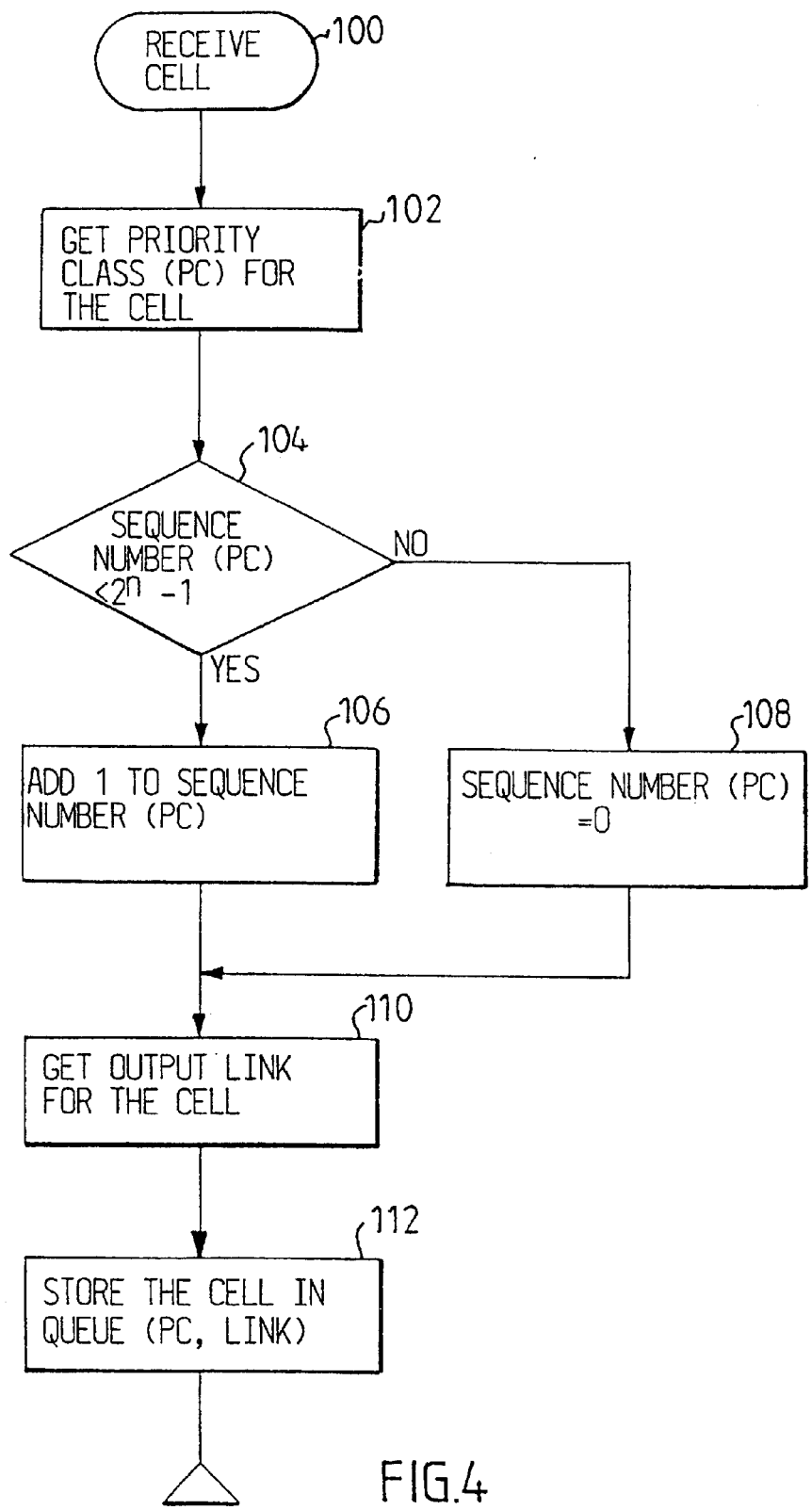
FIG. 4 is a flowchart of the events that take place when a cell arrives in the switch.

FIG. 2 shows schematically what happens when a cell is received in an ATM switch according to the invention. The flow chart for this is shown in FIG. 4. The essential parts of the inlet part of the switch is shown, together with a queue structure 11. The queue structure comprises a set of queues q1, q2, . . . , qn, q-mp for each priority class, p1, . . . , pm.

According to an exemplary embodiment of the invention, the inlet part of the switch comprises a number of sequence number registers, r1, . . . rm, each with one entry for each priority class and one for the point-to-multipoint queue.

A cell arrives at the cell receiving unit 13, where its priority class is determined. Then the cell receiving unit requests a sequence number from one of the sequence number registers r1, . . . rm, according to the priority class of the cell. If sequence numbers are used, the sequence number is added to the cell in a numbering unit 15. Units 13 and 15 may be the same unit. Each time a sequence number is added to a cell, the value of this sequence number in the register is incremented by one.

A queue selector s7 then places the cell in the right buffer q1, . . . qn, q-mp, according to the type of connection (point-to-point or point-to-multipoint), the priority class p1, . . . pm and, in case of a point-to-point connection, the number of the link.

Figure 3:
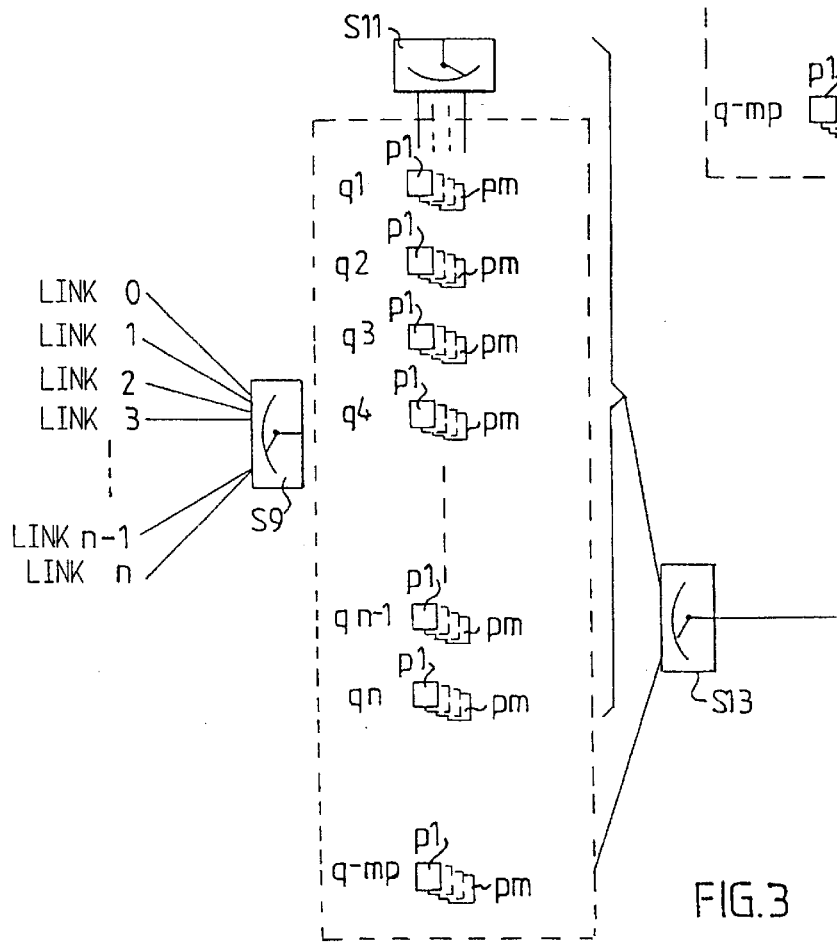
FIG. 3 shows schematically what happens when a cell is to be transmitted to the output.

FIG. 3 shows schematically what happens when a cell is to be transmitted to the output. A link selector s9 selects the link on which a cell should be transmitted, either by the round-robin principle or according to another algorithm. A priority class selector s11 selects the priority class which should be checked. The priority classes are checked in sequence.

An output queue selector s13 determines which cell should be transmitted first, according to the flow discussed below with reference to FIG. 5.

In the discussion above, it has been assumed that there is one point-to-multipoint queue in each priority class. However, this may lead to head-of-queue blocking, which occurs if the first cell in the point-to-multipoint queue is not going to be transmitted on the current link, but there are other cells in the point-to-multipoint queue which have been stored before the first cell in the point-to-point queue of the connection.

The risk of head-of-queue blocking may be reduced by increasing the number of point-to-multipoint queues, so that each point-to-multipoint queue receives cells for a group of connections in a certain priority class. One special case of this would be to have one point-to-multipoint queue for each connection in each priority class, that is, the same number of point-to-multipoint queues as of point-to-point queues.

However, this means that an incoming point-to-multipoint cell would have to be copied to all point-to-multipoint queues serving links on which the cell was to be transmitted. As mentioned earlier this copying takes time and thus requires high processor capacity to avoid delaying the transmission of other cells. Therefore, especially in systems with many links, the number of point-to-multipoint queues in each priority level must be selected so that the copying of point-to-multipoint cells to all appropriate queues will not delay the transmission.

FIG. 4 shows what happens when a cell is received in the ATM switch, according to a preferred embodiment of the invention:

Step 100: The cell is received in the switch.

Step 102: The priority class (pc) of the cell is determined.

Step 104: If the sequence number of the priority class (pc) smaller than 2n−1, go to step 106, otherwise go to step 108.

Step 106: Increment the sequence number for the priority class (pc) by one. Go to step 110.

Step 108: Set the sequence number for the priority class (pc) to zero. Go to step 110.

Step 110: Determine the output link of the cell.

Step 112: Store the cell in the correct queue according to the output link and the priority class of the cell.

Of course step 110 could be carried out at any point in the flow before storing the cell in the queue. Step 102 is only needed when more than one priority class is used.

Figure 5:
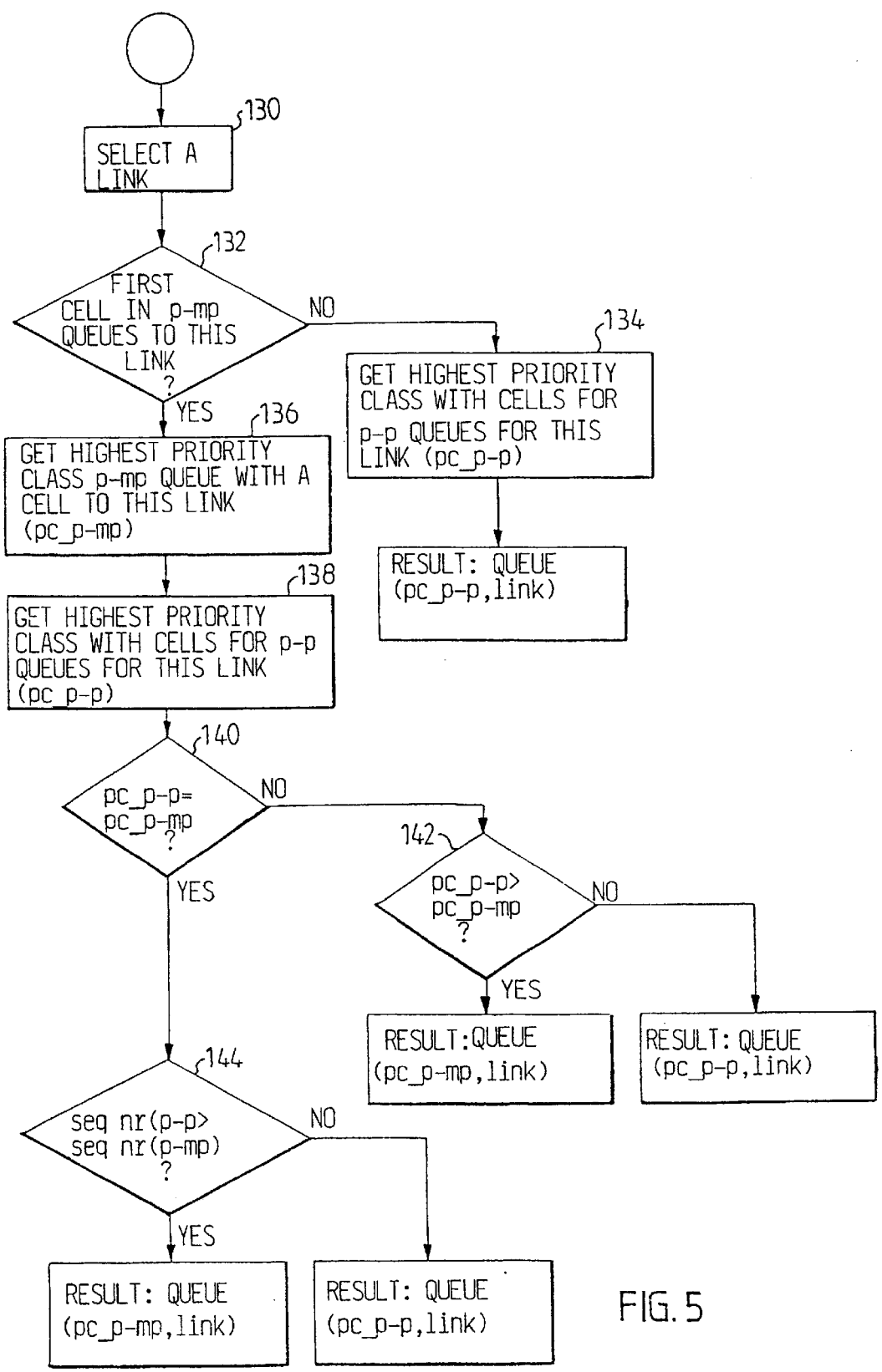
FIG. 5 is a flowchart showing how the queue from which cells are to be fetched is selected according to the invention.

FIG. 5 shows how the queue from which cells are to be fetched is selected according to the invention.

Step 130: A link is selected.

Step 132: Should the first cell of any point-to-multipoint queue be transmitted on this link? If no, go to step 134, otherwise go to step 136.

Step 134: Find the highest priority class which has point-to-point cells in the queue for this link and transmit a cell from this queue.

Step 136: Find the highest priority class which has point-to-multipoint cells destined for this link.

Step 138: Find the highest priority class which has point-to-point cells in the queue for this link.

Step 140: Is the priority class of the point-to-multipoint cell equal to the priority class of the point-to-point cell. If no, go to step 142, otherwise go to step 144.

Step 142: If the priority class of the point-to-point cell is higher than the priority class of the point-to-multipoint cell, the cell in the point-to-point queue will be transmitted to the output. If the priority class of the point-to-point cell is lower than the priority class of the point-to-multipoint cell, the cell in the point-to-multipoint queue will be transmitted.

Step 144: If the point-to-point cell was stored in the buffer before the point-to-multipoint cell, the point-to-point cell, will be transmitted to the output. If the point-to-point cell was stored in the buffer later than the point-to-multipoint cell, the point-to-multipoint cell will be transmitted to the output.

It will be readily understood that the order of steps 136 and 138 may be changed. When the priority class of one connection type has been determined, it is only necessary to search the priority classes higher than or equal to this priority class for the other connection type. Even if there are such cells in lower priority classes, they will not be selected for transmission In the embodiments described above only the first cell in each point-to-multipoint queue is checked. However, it is possible that later cells in one or more point-to-multipoint queues are destined for the current link, but no first cell of any point-to-multipoint queue. In this case, full fairness between point-to-point and point-to-multipoint connections may not be achieved.

In another embodiment, all cells in the point-to-multipoint queues are checked to see if any cell in any of these queues are destined for the current link. (Of course, the search of a queue may be stopped as soon as such a cell is found in this queue.) This solution requires more processor capacity for the switch to be able to work at the same speed, as more operations must be carried out in the same time. It also leads to certain requirements on the point-to-multipoint queue structures, i.e. they must allow any cell in the queue to be transmitted, not only the first cell.

It is necessary to be able to determine which one of two cells has arrived first. This can be done in several different ways. In a preferred embodiment, sequence numbers are used for this purpose. For each priority class there is a binary sequence number. Two's complement is used, that is, a binary number is used to represent both positive and negative values. In this way, for example, an eight-bit binary number will represent decimal number from −127 to 128 instead of from 0 to 256. When a cell belonging to a specific priority class arrives, the sequence number for that priority class is incremented, and the new value of the sequence number is written to the header of the incoming cell.

When the sequence number has reached 2n−1, n being the number of bits in the sequence number register, the next sequence number will be zero because of wrap-around, therefore it cannot immediately be determined which cell was actually stored first.

Figure 6:
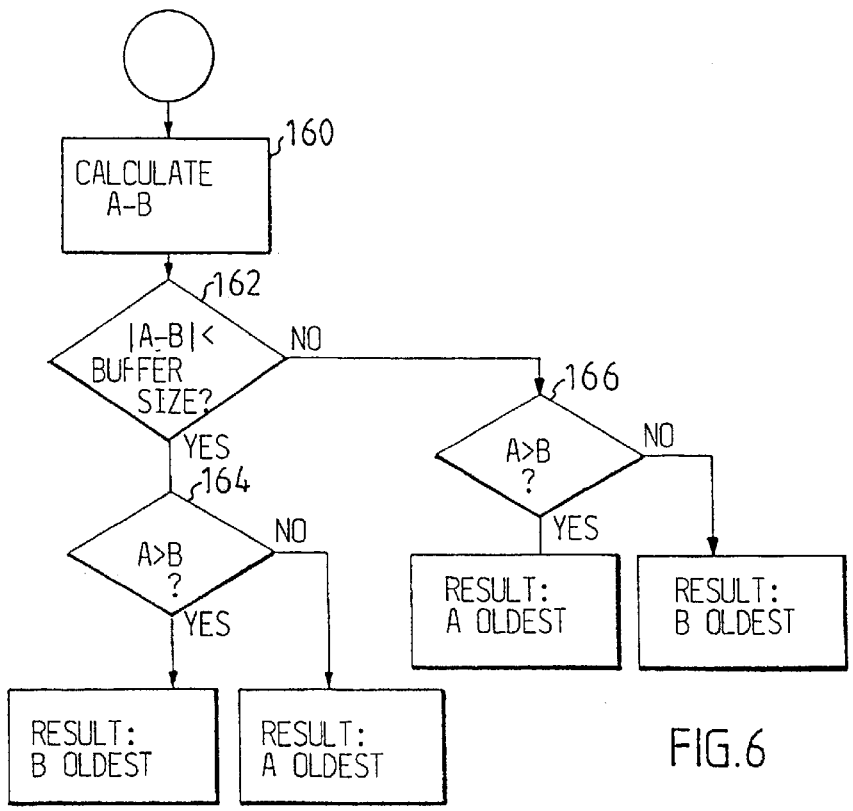
FIG. 6 is a flowchart of how it is determined which cell is to be transmitted first according to one embodiment of the invention.

FIG. 6 is a flowchart of the algorithm used to determine which one of two cells was first stored, according to a preferred embodiment of the invention. The sequence numbers of the two cells, cell A with sequence number A and cell B with sequence number B, are compared in the following steps:

Step 160: The value of A−B is calculated. Go to step 162.
Step 162: If the absolute value of A−B is smaller than the size of the buffer, go to step 164, otherwise go to step 166.
Step 164: If A>B, then cell B was stored first and should be transmitted before cell A. If B>A, then cell A was stored first and should be transmitted before cell B.
Step 166: If A>B then cell A was stored first and should be transmitted before cell B. If B>A, then cell B was stored first and should be transmitted before cell A.

There are other ways of determining if a wrap has occurred. For example, a flag can be set. In this case, it must be possible to know what the flag was last set to. For this, one bit in a separate register may be used.

It is also possible to determine when the value of the flag is the same for all the cells in a buffer and then change for all at the same time. For example, if the flag is first set to 0, then when a wrap occurs the flag will be set to 1 for all new cells. When the next wrap occurs, all the flags will be 1. At this point all flags may be reset to 0. In this way, the oldest have the flag set to 0, while the flag of the newest cell will always be 1.

Alternatively, each cell might be time stamped when they are placed in a buffer, although this would be a more expensive method, as synchronization of all inlet ports would be required. The invention is not dependent on any particular method as long as it can be determined which one of two cells has arrived first.

In the discussion of the invention, ATM switches have been used as an example. However, the method is not restricted to ATM switches, but may be used in any kind of packet switch to achieve fair share between point-to-point connections and point-to-multipoint connections.

What is claimed is:

1. Method for achieving fair share between point-to-point connections and point to-multipoint connections in a switch, comprising at least one buffer for each physical link and at least one buffer for point-to-multipoint connections, the method comprising the steps of:

storing the cells belonging to point-to-point connections in a queue structure according to the physical link on which they are transmitted;

storing the cells belonging to point-to-multipoint connections in another queue for point-to-multipoint connections;

selecting a physical link on which a point-to-point cell should be transmitted;

determining if the first cell in the point-to-multipoint queue should be transmitted on the physical link selected;

if both a point-to-point cell and a point-to-multipoint cell should be transmitted on the physical link selected, determining which one of the point-to-point cell and the point-to-multipoint cell was first stored in the queue structure and transmitting this cell to an output queue.

2. A method according to claim 1, further comprising determining the priority class of the point-to-point cell and the point-to-multipoint cell and selecting the cell which belongs to the highest priority class.

3. A method for achieving fair share between point-to-point connections and point to-multipoint connections in a switch, comprising at least one buffer for each physical link and at least one buffer for point-to-multipoint connections, the method comprising the steps of:

storing the cells belonging to point-to-point connections in a queue structure according to the physical link on which they are transmitted;

storing the cells belonging to point-to-multipoint connections in another queue for point-to-multipoint connections;

selecting a physical link on which a point-to-point cell should be transmitted;

determining if the first cell in the point-to-multipoint queue should be transmitted on the physical link selected;

if both a point-to-point cell and a point-to-multipoint cell should be transmitted on the physical link selected, determining which one of the point-to-point cell and the point-to-multipoint cell was first stored in the queue structure and transmitting this cell to an output queue, wherein the first stored cell is determined by:

adding a sequence number to the cell, depending on the cell's priority class and physical link, before the cell is stored in the buffer;

for any two cells that should be compared, calculating the difference between their sequence numbers;

if the absolute value of the difference between the sequence numbers is smaller than the size of the buffers, then transmitting the cell with the lowest sequence number; and if the absolute value of the difference between the sequence numbers is greater than the size of the buffers, then transmitting the cell with the highest sequence number.

4. A switch comprising a number of inlet ports, a number of outlet ports, a switch core to which the outlet and inlet ports are connected, a queue structure including at least one queue for point-to-point connections on each physical link and at least one queue for point-to-multipoint connections, a selector which stores each incoming cell in the appropriate queue, a link selector, means for determining if the first cell in a multislot queue should be transmitted on a selected link, an output queue selector adapted to select a cell to transmit according to the cell's physical link and the time when the cell was stored, so that for each link, the cell that was stored first is transmitted first.

5. A switch according to claim 4, further comprising:

two or more queue structures to allow cells with different priority classes to be stored in different queue structures, and a priority class selector to select a priority class to be searched for a cell to be transmitted to the output queue.

6. A switch comprising:

a number of inlet ports;

a number of outlet ports;

a switch core to which the outlet and inlet ports are connected;

a queue structure including at least one queue for point-to-point connections on each physical link and at least one queue for point-to-multipoint connections;

a selector which stores each incoming cell in the appropriate queue;

a link selector:

means for determining if the first cell in a multislot queue should be transmitted on a selected link;

an output queue selector adapted to select a cell to transmit according to the cell's physical link and the time when the cell was stored, so that for each link, the cell that was stored first is transmitted first;

two or more queue structures to allow cells with different priority classes to be stored in different queue structures; and a priority class selector to select a priority class to be searched for a cell to be transmitted to the output queue, wherein a logical weight is assigned to each link, and each link is selected for transmission of a cell at a rate depending on the logical weight of the link.

* * * * *